(12) United States Patent
Tsai et al.

(10) Patent No.: US 11,231,494 B2
(45) Date of Patent: Jan. 25, 2022

(54) RADAR SYSTEM HAVING VEHICLE ASSIST FUNCTION WITH FIELD OF VIEW GREATER THAN 160 DEGREES

(71) Applicant: ROYALTEK COMPANY LTD., Taoyuan (TW)

(72) Inventors: Ming-Hung Tsai, Taoyuan (TW); Chun-Yen Chen, Taoyuan (TW)

(73) Assignee: Royaltek Company Ltd., Taoyuan (TW)

( * ) Notice: Subject to any disclaimer, the term of this patent is extended or adjusted under 35 U.S.C. 154(b) by 300 days.

(21) Appl. No.: 16/445,443

(22) Filed: Jun. 19, 2019

(65) Prior Publication Data

US 2020/0355814 A1 Nov. 12, 2020

(30) Foreign Application Priority Data

May 9, 2019 (TW) .................................. 108116069

(51) Int. Cl.
*G01S 13/08* (2006.01)
*G01S 7/04* (2006.01)
(Continued)

(52) U.S. Cl.
CPC ................ *G01S 13/08* (2013.01); *G01S 7/04* (2013.01); *G01S 13/931* (2013.01); *H04B 7/02* (2013.01)

(58) Field of Classification Search
None
See application file for complete search history.

(56) References Cited

U.S. PATENT DOCUMENTS

| 5,767,793 A * | 6/1998 | Agravante | ............ G01S 13/931 340/903 |
| 6,814,171 B2 * | 11/2004 | Polak | ........................ B60T 7/22 180/169 |

(Continued)

FOREIGN PATENT DOCUMENTS

| CN | 102623795 A | 8/2012 |
| CN | 105022064 A | 11/2015 |
| TW | I590969 B | 7/2017 |

OTHER PUBLICATIONS

Search Report Issued by Foreign Patent Office in Application No. 108116069.

*Primary Examiner* — Bernarr E Gregory
(74) *Attorney, Agent, or Firm* — Rosenberg, Klein & Lee

(57) ABSTRACT

A radar system having a vehicle assist function with a field of view greater than 160 degrees is provided. The radar system includes antenna boards and a processing unit. The antenna board includes multiple antennas disposed thereon and transmitting a detection signal to detect an obstacle outside the vehicle, and then receiving a reflected signal, generated by the detection signal reflected by the obstacle. Therefore, the single radar system is enough for the vehicle assist function, and the transmitting and receiving antennas are disposed on the antenna board. The processing unit can directly analyze the reflected signal to determine a distance between the obstacle and the vehicle, and perform different vehicle assist functions having different warning distances, and when the distance between the obstacle and the vehicle is lower than one of the warning distances, the processing unit outputs a warning message to warn a driver.

13 Claims, 12 Drawing Sheets

(51) Int. Cl.
*G01S 13/931* (2020.01)
*H04B 7/02* (2018.01)

(56) References Cited

U.S. PATENT DOCUMENTS

| | | | |
|---|---|---|---|
| 9,329,265 B2* | 5/2016 | Murad et al. | G01S 13/931 |
| 10,627,507 B1* | 4/2020 | Parker | G01S 13/931 |
| 2008/0088499 A1* | 4/2008 | Bonthron | G01S 13/931 |
| | | | 342/104 |
| 2012/0194377 A1* | 8/2012 | Yukumatsu | G01S 13/931 |
| | | | 342/70 |
| 2013/0181860 A1* | 7/2013 | Le | G01S 13/931 |
| | | | 342/72 |
| 2014/0313069 A1* | 10/2014 | Tseng | G01S 7/032 |
| | | | 342/175 |
| 2015/0260828 A1* | 9/2015 | Ossowska | G01S 13/931 |
| | | | 342/70 |
| 2015/0301157 A1* | 10/2015 | Ossowska | G01S 13/931 |
| | | | 342/173 |
| 2016/0291149 A1* | 10/2016 | Zeng | G01S 13/931 |

\* cited by examiner

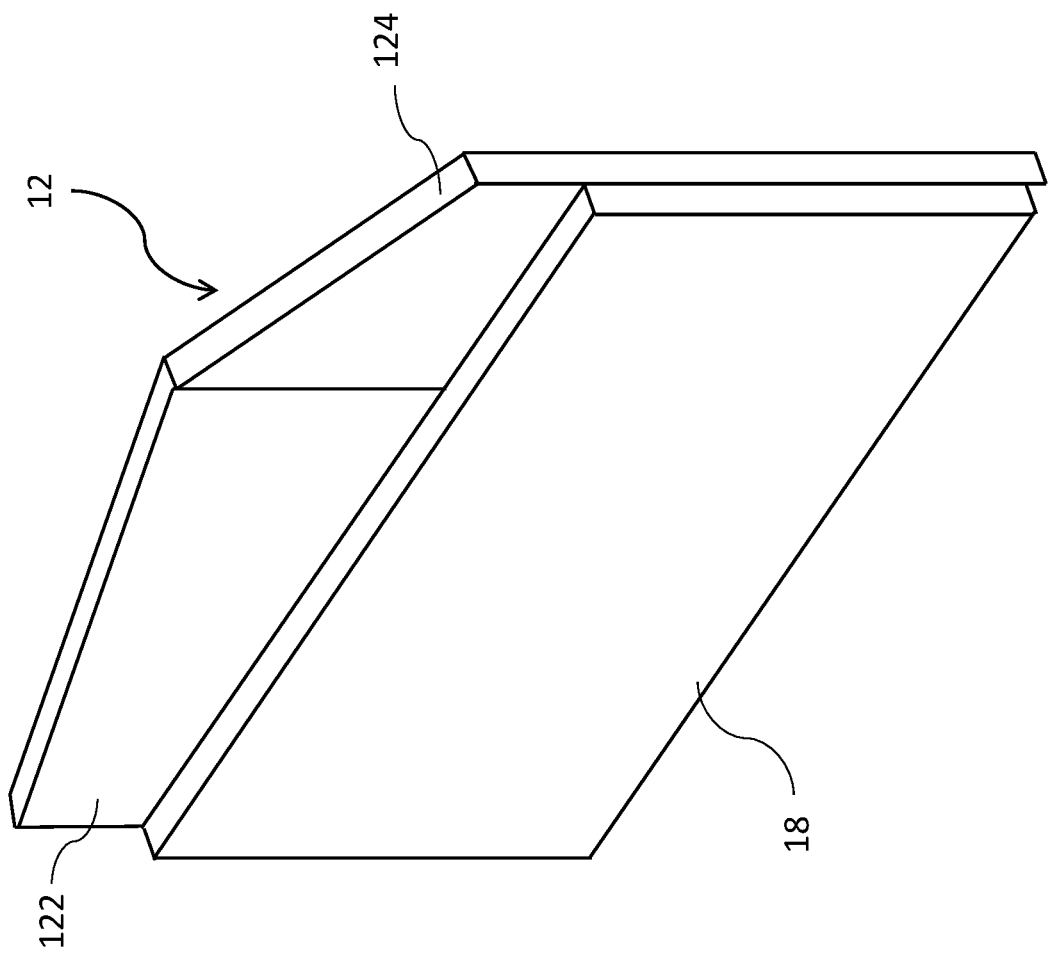

RADAR SYSTEM HAVING VEHICLE ASSIST FUNCTION WITH FIELD OF VIEW GREATER THAN 160 DEGREES

This application claims priority for Taiwan patent application no. 108116069 filed on May 9, 2019, the content of which is incorporated by reference in its entirely.

BACKGROUND OF THE INVENTION

1. Field of the Invention

The present invention relates to a radar system for a vehicle, and more particularly to a radar system having a vehicle assist function with a field of view greater than 160 degrees.

2. Description of the Related Art

As technology advances, it also brings greater safety and convenience in driving vehicle, for example, the vehicle can be installed with a radar to measure distances from the vehicle to obstacles behind and ahead of the vehicle, and a warning sound is produced when one of the distances is too close, and such driving assist manner is quite practical for a driver unfamiliar with the vehicle condition and the length of the vehicle body, and can reduce the driver's blind spot and prevent the vehicle from hitting a vehicle there behind during reversing, or hitting a front vehicle during driving. The existing vehicle assist technology can be applied to an adaptive cruise control (ACC) system, a blind spot detection (BSD) system, and a door open warning (DOW) system.

In general, a vehicle assist system, such as a parking assist system (PAS), a blind spot detection (BSD) system, or a lane change alert (LCA) system, can use the above-mentioned vehicle radar, but the vehicle assist system must be implemented by two independent radar systems mounted on two opposite sides of a bumper of the vehicle, respectively, and each of the radar systems can transmit a detection signal and then receive a detection result signal, and transmit the detection result signal to an in-vehicle system which can calculate a distance between the vehicle and an obstacle, and determine whether to generate a warning message. Therefore, the in-vehicle system needs to install software of the vehicle assist systems. The cost of such kind of traditional RADAR systems are high and increase the time of installation for multiple RADAR systems.

For this reason, the present invention proposes a radar system having a vehicle assist function with a field of view greater than 160 degrees, and it just needs to install a radar system on a bumper of a vehicle or next to a license plate light of the vehicle, and the functions of distance detection, obstacle calculation and determination whether to output warning message and so on can be completed on the radar system, so as to effectively solve the above problems. The particular architecture and implementation of the radar system of the present invention will be detailed in following paragraphs.

SUMMARY OF THE INVENTION

An objective of the present invention is to provide a radar system having a vehicle assist function with a field of view greater than 160 degrees, and a vehicle assist system can be installed in the radar system, so that a warning function of the vehicle assist system can be prevented from being affected by a failure of an in-vehicle system.

Another objective of the present invention is to provide a radar system having a vehicle assist function with a field of view greater than 160 degrees, and the radar system includes antenna boards and a processing unit, and the processing unit can be disposed on the antenna board and can perform a vehicle assist system, and receive and analyze a signal of an antenna, and when an analysis result indicates that it is necessary to warn a driver, the processing unit displays a warning message on a screen of an in-vehicle system or a display device of the vehicle, or triggers a speaker to make a warning sound, or turns on a warning light.

Another objective of the present invention is to provide a radar system having a vehicle assist function with a field of view degrees greater than 160 degrees, and a processing unit of the radar system is disposed on an independent main board, and the main board is electrically connected to an antenna board of the radar system, so as to provide convenience to repair and replace the processing unit when the processing unit is damaged.

In order to achieve the objectives, the present invention provides a radar system having a vehicle assist function with a field of view greater than 160 degrees, and the radar system includes at least one antenna board and at least one processing unit. The at least one antenna board includes a plurality of antennas disposed thereon and configured to output at least one detection signal to detect at least one obstacle outside a vehicle, and receive at least one reflected signal, which is generated by the at least one detection signal reflected by the at least one obstacle. The at least one processing unit is disposed on the at least one antenna board or electrically connected to the at least one antenna board, and configured to receive and analyze the at least one reflected signal, to determine a distance between the at least one obstacle and the vehicle. The processing unit is able to perform a plurality of vehicle assist functions, and at least one different warning distance is defined for the plurality of vehicle assist functions, and when the distance between the at least one obstacle and the vehicle is lower than or equal to less than or equal to the warning distance, the processing unit outputs a warning message to the vehicle, to warn a driver.

According to an embodiment, the processing unit can be a microprocessor, one of the plurality of antennas can be a patch antenna, a slot antenna, a monopole antenna, a dipole antenna, or a horn antenna, and the radar system of the present invention can include a reflective plate having a reflective surface in a ¼ circular shape, an arc shape or a parabolic shape, and the reflective plate is perpendicular to the antenna board; and the plurality of vehicle assist functions can include a function of a parking assist system (PAS), a blind spot detection (B SD) system, a lane change alert (LCA) system, a rear cross traffic alert (RCTA) system or an open door warning system.

According to an embodiment, the plurality of antennas can include at least one transmitting antenna and at least one receiving antenna, and the transmitting antenna is configured to transmit the at least one detection signal, and the receiving antenna is configured to receive the at least one reflected signal, and transmit the at least one reflected signal to the processing unit.

According to an embodiment, the antenna board can include a first antenna board and a second antenna board, and the first antenna board and the second antenna board are connected to form an inverted-V shape; and the processing unit can be disposed on the first antenna board or the second antenna board.

According to an embodiment, the antenna board can include a first antenna board and a second antenna board, and the first antenna board and the second antenna board are connected to form an inverted-V shape; and radar system can include a main board connected to the second antenna board and the first antenna board side by side in a lateral direction to form a triangle, and the processing unit is disposed on the main board.

According to an embodiment, the antenna board can include a first antenna board and a second antenna board, and the first antenna board and the second antenna board are connected to form an inverted-V shape; and the radar system of the present invention can include a main board perpendicularly connected to an included corner between the first antenna board and the second antenna board, and the processing unit is disposed on the main board.

According to an embodiment, the radar system can include a main board disposed in parallel to the antenna board. A bottom surface of the antenna board is connected to a top surface of the main board, and the processing unit is disposed on the main board.

According to an embodiment, the antenna board comprises at least one transmission cable disposed thereon and electrically connected to the main board via a plurality of pins or printed circuit board traces.

According to an embodiment, the radar system can include a reflective plate having a reflective surface in a ¼ circular shape, an arc shape or a parabolic shape, and the reflective plate is perpendicular to the antenna board, and the processing unit is disposed on or above the main board.

BRIEF DESCRIPTION OF THE DRAWINGS

The structure, operating principle and effects of the present invention will be described in detail by way of various embodiments which are illustrated in the accompanying drawings.

FIG. 3 is a schematic view of a second embodiment of a radar system having a vehicle assist function with a field of view greater than 160 degrees, according to the present invention.

DETAILED DESCRIPTION OF THE PREFERRED EMBODIMENTS

Figure 1B:
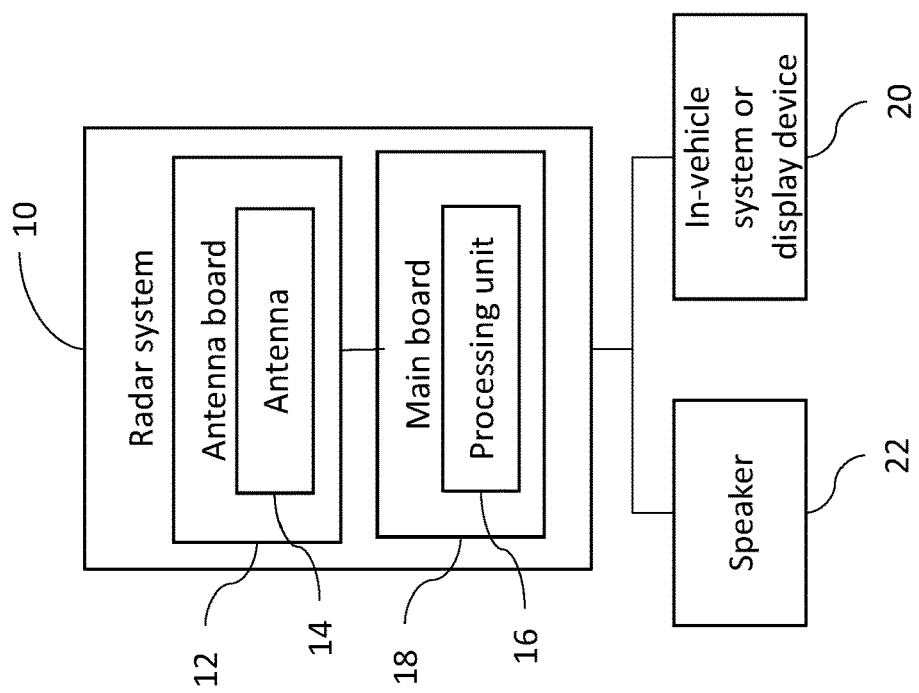
FIGS. 1A and 1B are block diagrams of a radar system having a vehicle assist function with a field of view greater than 160 degrees, according to the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It will be acknowledged that when an element or layer is referred to as being "on," "connected to" or "coupled to" another element or layer, it can be directly on connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be acknowledged to imply the inclusion of stated elements but not the exclusion of any other elements.

Figure 1A:
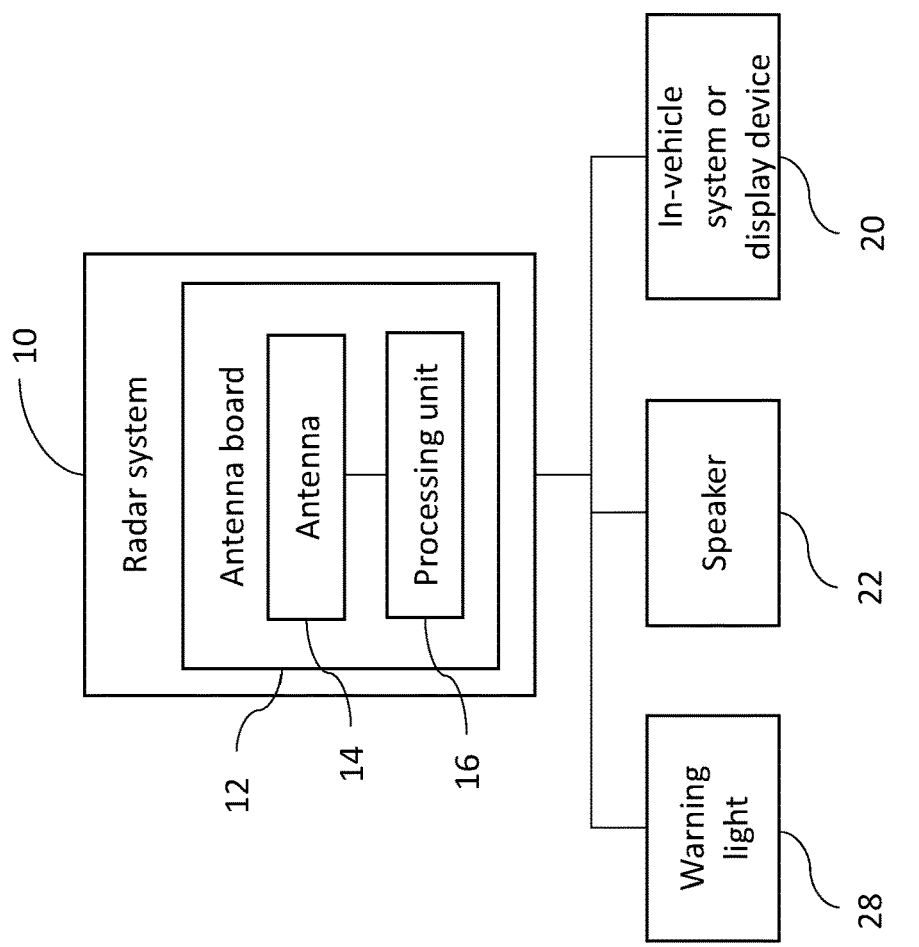

The present invention provides a radar system having a vehicle assist function with a field of view greater than 160 degrees. The radar system can be mounted on a bumper of a vehicle, such as on at least one of front and rear bumpers of the vehicle; or, the radar system can be mounted next to a license plate light; however, the present invention is not limited to these examples. A processing unit having a vehicle assist function with a field of view greater than 160 degrees can be directly installed on the radar system. Please refer to FIGS. 1A and 1B, which are block diagrams of a radar system 10 of the present invention. The radar system 10 can include at least one antenna board 12 and at least one processing unit 16. The at least one antenna board 12 includes a plurality of antennas 14 disposed thereon and configured to output at least one detection signal to detect at least one obstacle outside the vehicle, which is not shown in FIGS. 1A and 1B. The plurality of antennas 14 can receive at least one reflected signal generated by the detection signal reflected by the obstacle. The processing unit 16 can be disposed on the antenna board 12 or electrically connected to the antenna board 12. In the embodiment of FIG. 1A, the processing unit 16 is disposed on the antenna board 12, and in FIG. 1B, the processing unit 16 is disposed on the main board 18, and the main board 18 is connected to the antenna board 12. In an embodiment, the processing unit 16 can be a microprocessor. After receiving the reflected signal, the processing unit 16 analyzes the reflected signal to calculate a distance between the obstacle and the vehicle. The processing unit 16 can have and perform a plurality of vehicle assist functions such as a function of a parking assist system (PAS), a blind spot detection (BSD) system, a lane change alert (LCA) system, a rear cross traffic alert (RCTA) or an open door warning system (DOW). Each vehicle assist function defines at least one warning distance, and the warning distances of the different vehicle assist functions may be different. When the distance between the obstacle and the vehicle is less than or equal to one of the warning distances, the processing unit 16 outputs a warning message to the vehicle, so as to warn the driver, and the warning method includes the manner of transmitting the warning message to an in-vehicle system or a display device 20 of the vehicle to display the warning message on a screen of the in-vehicle system or the display device 20, or triggering a speaker 22 of the vehicle to make a warning sound, or turning on the at least one warning light 28. In an embodiment, the warning light 28 can be an LED lamp. According to some embodiments of the radar system of the present invention, the configuration of the antenna board 12 and the processing unit 16 can include various structures, and the embodiments are described in detail below; however, the claim scope of the present invention is not limited to the described embodiments, and any antenna system in which the processing unit 16 is disposed on the antenna board 12, or on the main board 18 connected to the antenna board 12, and the processing unit 16 can perform multiple vehicle assist functions, is consequently viewed as being embraced by the spirit and the scope of the present invention set forth in the claims.

Furthermore, the antennas 14 include at least one transmitting antenna (not shown in FIGS. 1A and 1B) and at least one receiving antenna. The transmitting antenna can transmit a detection signal to detect at least one surrounding obstacle, and the receiving antenna can receive a reflected signal reflected by the obstacle, and transmit the reflected signal to the processing unit 16 for calculation. In some embodiments, the transmitting antenna and the receiving antenna can be the same types or different types.

Figure 2B:
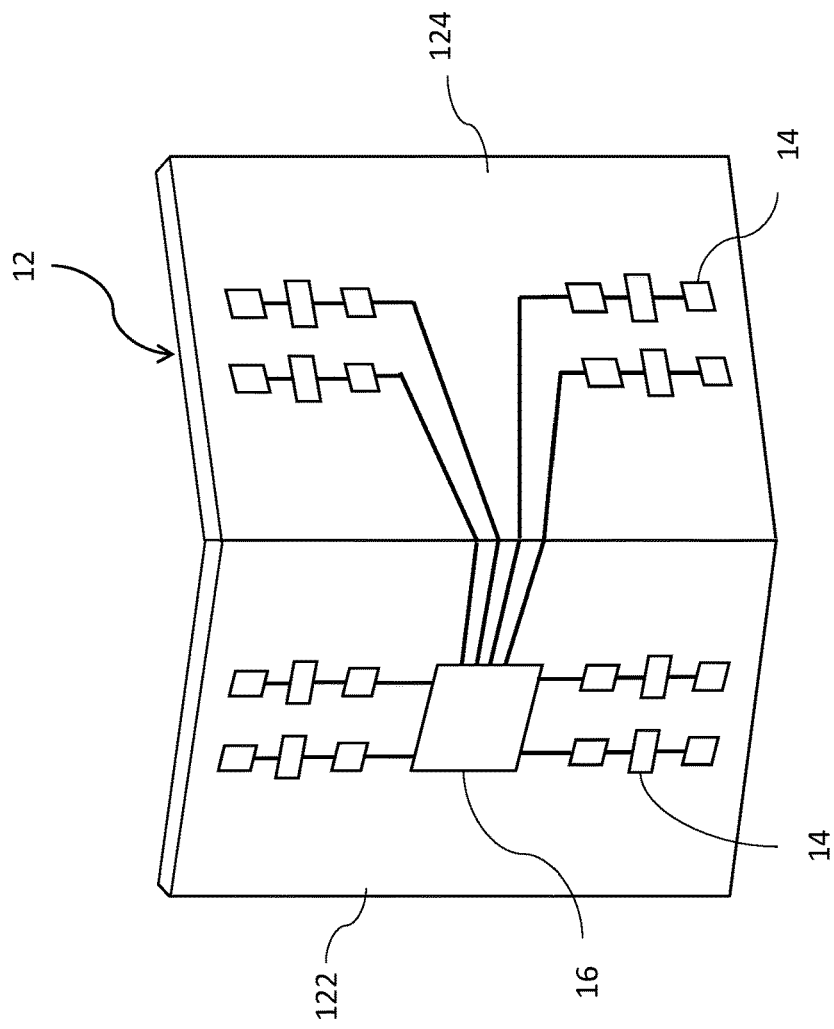
FIGS. 2A and 2B are schematic views of a first embodiment of a radar system having a vehicle assist function with a field of view greater than 160 degrees, according to the present invention.
Figure 2A:
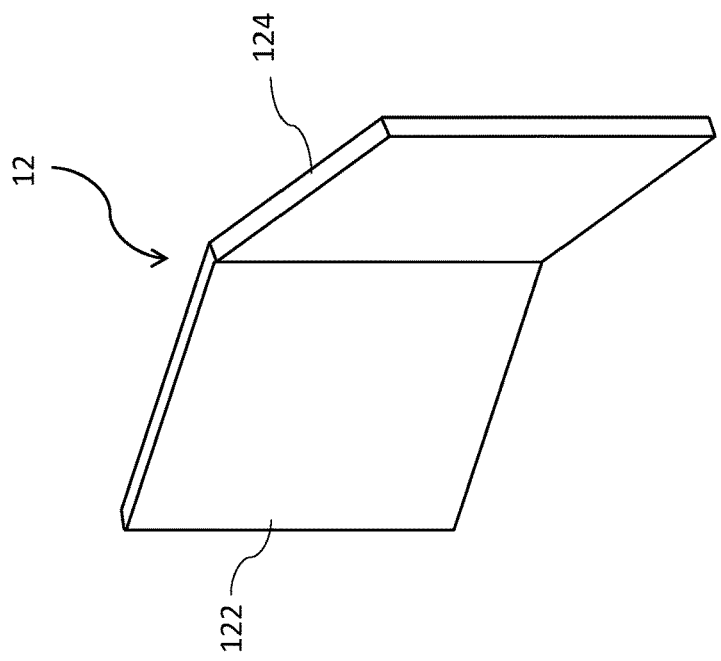

Please refer to FIGS. 2A and 2B, which are schematic views of a first embodiment of a radar system having a vehicle assist function with a field of view greater than 160 degrees, according to the present invention. The antenna board 12 can include a first antenna board 122 and a second antenna board 124. The first antenna board 122 and the second antenna board 124 are connected to form an inverted-V shape. The processing unit 16 is disposed on the first antenna board 122; alternatively, the processing unit 16 can be disposed on the second antenna board 124.

FIG. 3 is a schematic view of a second embodiment of a radar system having a vehicle assist function with a field of view greater than 160 degrees, according to the present invention. The second embodiment of the radar system adds a main board 18 on the basis of the first embodiment, and the processing unit (not shown in FIG. 3) is disposed on the main board 18. The main board 18 is connected to the second antenna board 124 and the first antenna board 122 side by side in a lateral direction, to form a triangle. Each of the first antenna board 122 and the second antenna board 124 only includes the antenna without the processing unit. Because of being located on the other sides of the main board 18, the second antenna board 124 and the first antenna board 122, the antennas and the processing unit are not shown in FIG. 3.

Figure 4B:
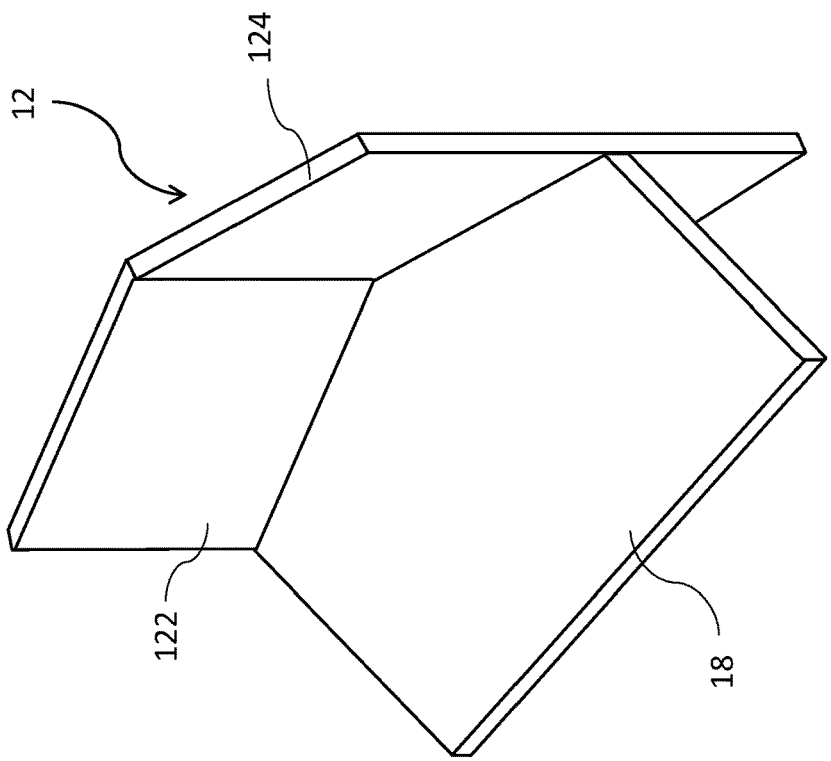
FIGS. 4A and 4B are schematic views of a third embodiment of a radar system having a vehicle assist function with a field of view greater than 160 degrees, according to the present invention.
Figure 4A:
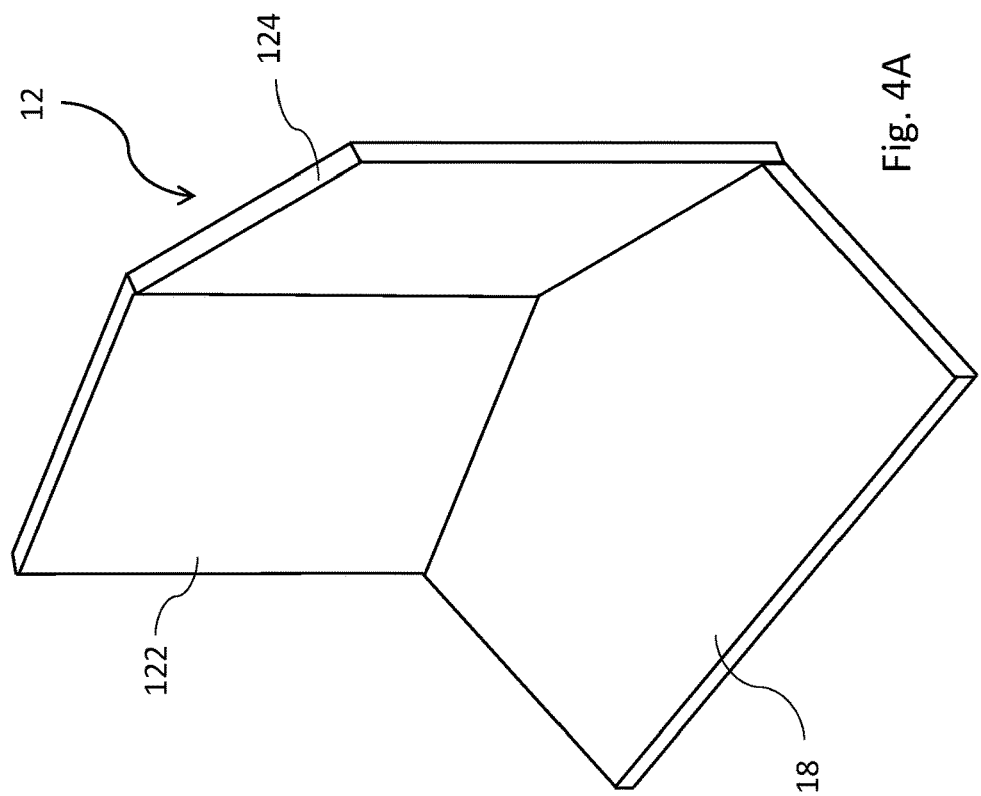
Figure 5B:
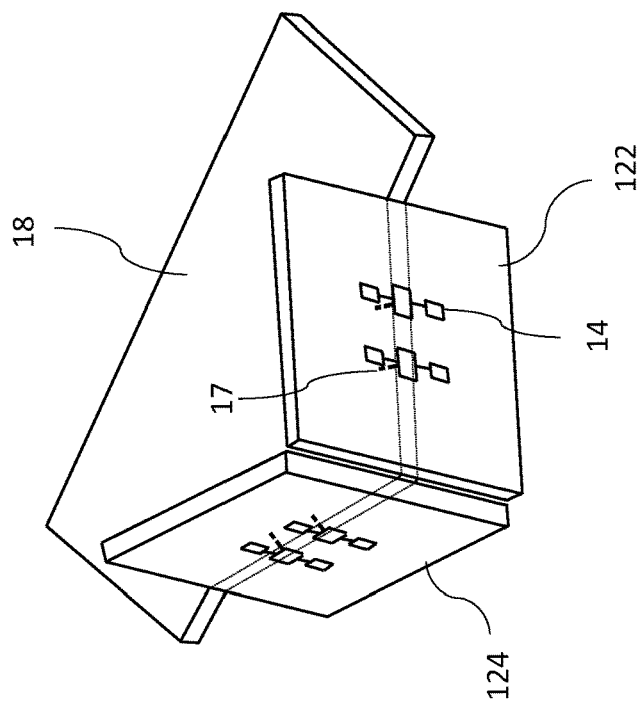
FIGS. 5A and 5B are schematic views of the third embodiment of a radar system having a vehicle assist function with a field of view greater than 160 degrees, according to the present invention, when viewed from another direction.
Figure 5A:
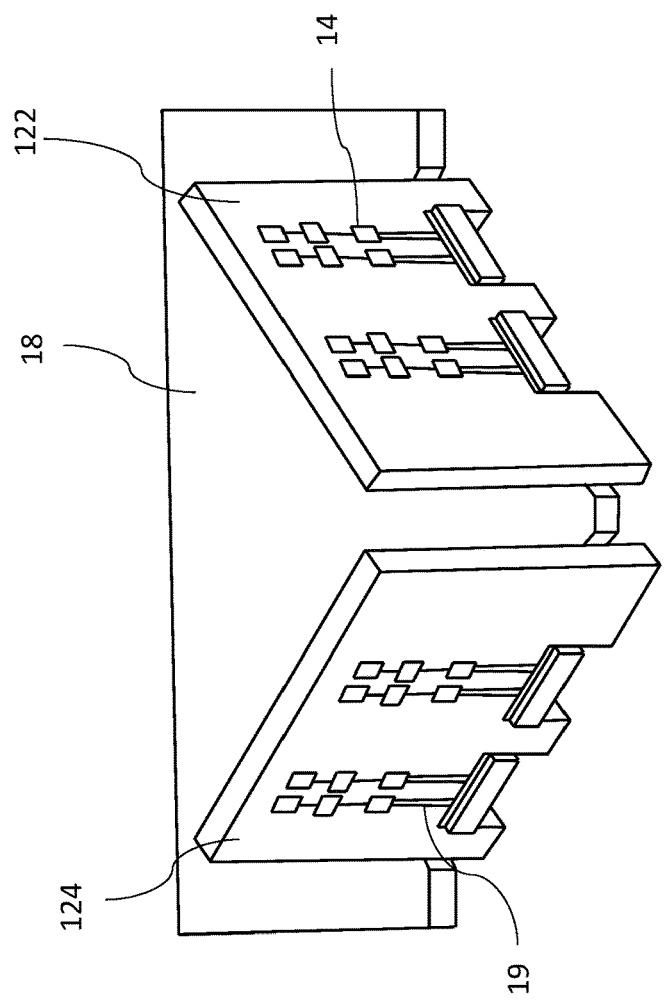

FIGS. 4A and 4B are schematic views of a third embodiment of a radar system having a vehicle assist function with a field of view greater than 160 degrees, according to the present invention. In the third embodiment, the main board 18, which is the same as that of the second embodiment, is perpendicularly connected to an included corner between the first antenna board 122 and the second antenna board 124. For example, the main board 18 can be connected to middle parts of the first antenna board 122 and the second antenna board 124, as shown in FIG. 4B, or can be connected to upper sides or lower sides of the first antenna board 122 and the second antenna board 124, as shown in FIG. 4A. Please refer to FIGS. 5A and 5B, which are schematic views of the third embodiment of the radar system when viewed from another direction. As shown in FIGS. 5A and 5B, each of the first antenna board 122 and second antenna board 124 includes only the antennas 14 disposed thereon, and each of the first antenna board 122 and second antenna board 124 also include at least one transmission cable disposed thereon and electrically connected to the main board 18 via a plurality of pins 17 or printed circuit board (PCB) traces 19.

Figure 6B:
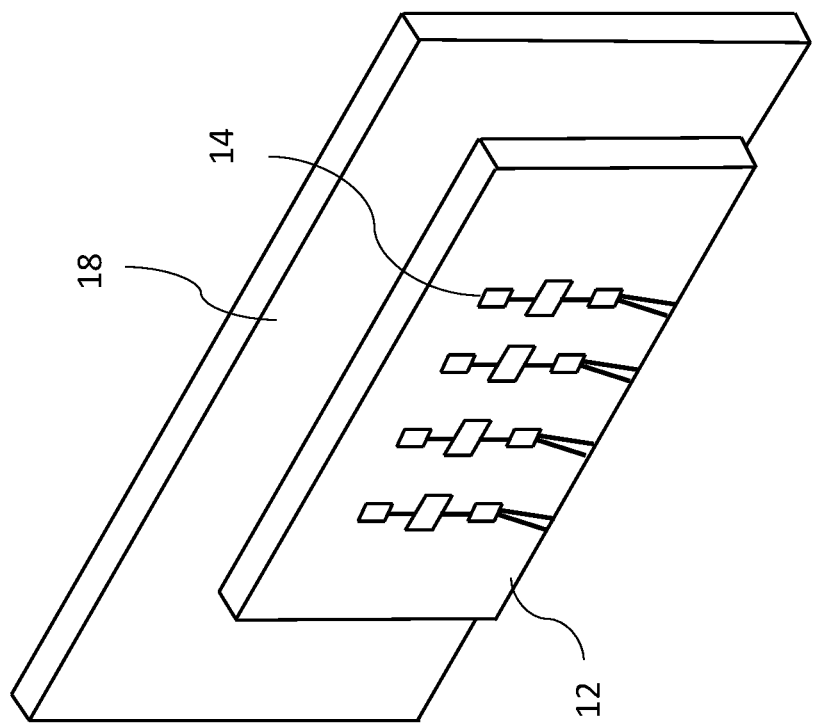
FIGS. 6A and 6B are schematic views of a fourth embodiment of a radar system having a vehicle assist function with a field of view greater than 160 degrees, according to the present invention.
Figure 6A:
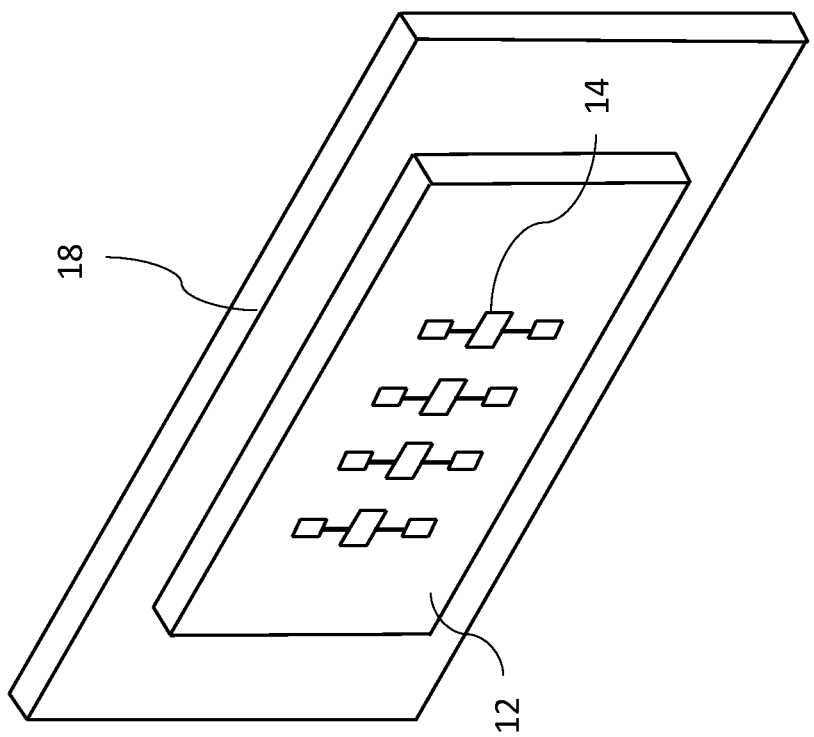

FIGS. 6A and 6B are schematic views of a fourth embodiment of a radar system having a vehicle assist function with a field of view greater than 160 degrees, according to the present invention. In the fourth embodiment, the radar system has a configuration of a sub-board and a main board, and the radar system includes only one antenna board 12, and the main board 18 is parallel to the antenna board 12, and a bottom surface of the antenna board 12 is connected to a top surface of the main board 18, and the processing unit (not shown in FIGS. 6A and 6B) is disposed on the main board 18.

According to an embodiment of the present invention, the antenna can be a patch antenna, a slot antenna, a monopole antenna, a dipole antenna or a horn antenna, and these different forms of antennas can be made by metal wires, metal conductors, printed circuit boards, or ceramic materials.

Figure 7B:
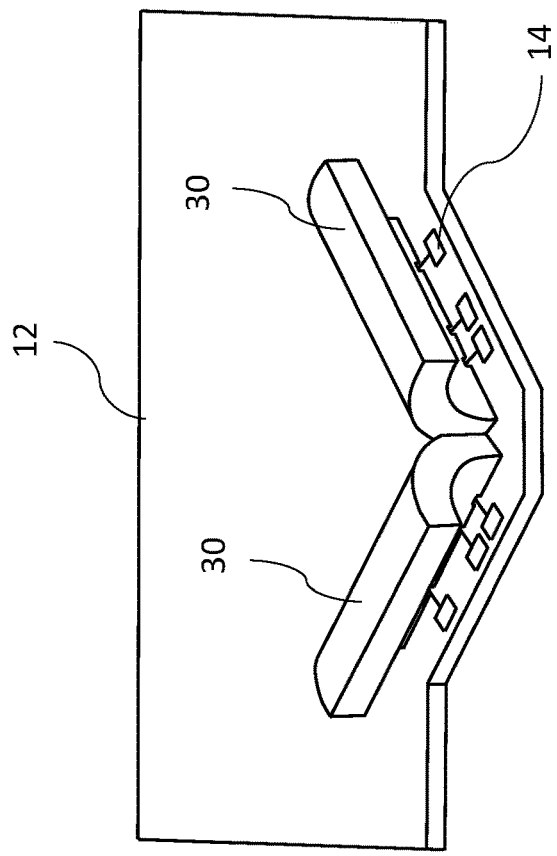
FIGS. 7A and 7B are schematic views of a fifth embodiment of a radar system having a vehicle assist function with a field of view greater than 160 degrees, according to the present invention.
Figure 7A:
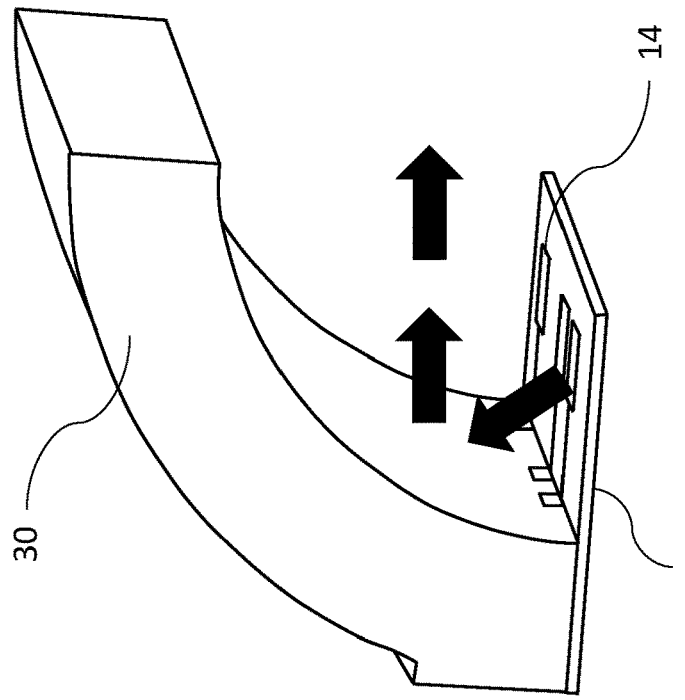

FIGS. 7A and 7B are schematic views of a fifth embodiment of a radar system having a vehicle assist function with a field of view greater than 160 degrees, according to the present invention. As shown in FIG. 7A, the antenna board 12 is a printed circuit board, the antennas 14 are disposed on the antenna board 12, and a reflective plate 30 is disposed on or above the antenna board 12 and is perpendicular to the antenna board 12 by 90 degrees. In an embodiment, the reflective plate 30 can have a reflective surface in a ¼ circular shape, an arc shape, a parabolic shape, or other shape. The reflective plate 30 having the radian surface can turn the path of a wave of the detection signal, to reflect the detection signal. FIG. 7B shows another aspect of the fifth embodiment, and the shape of the antenna board 12 is the same as that of the main board of the third embodiment; however, in the fifth embodiment, the antennas 14 are directly disposed on the main board, and the main board serves as the antenna board 12, and the reflective plate 30 is disposed above the antennas 14. Because of the shape of the antenna board 12 in FIG. 7B, two reflective plates 30 are required to turn the path of the wave of the detection signal, to reflect the detection signal.

Figure 8:
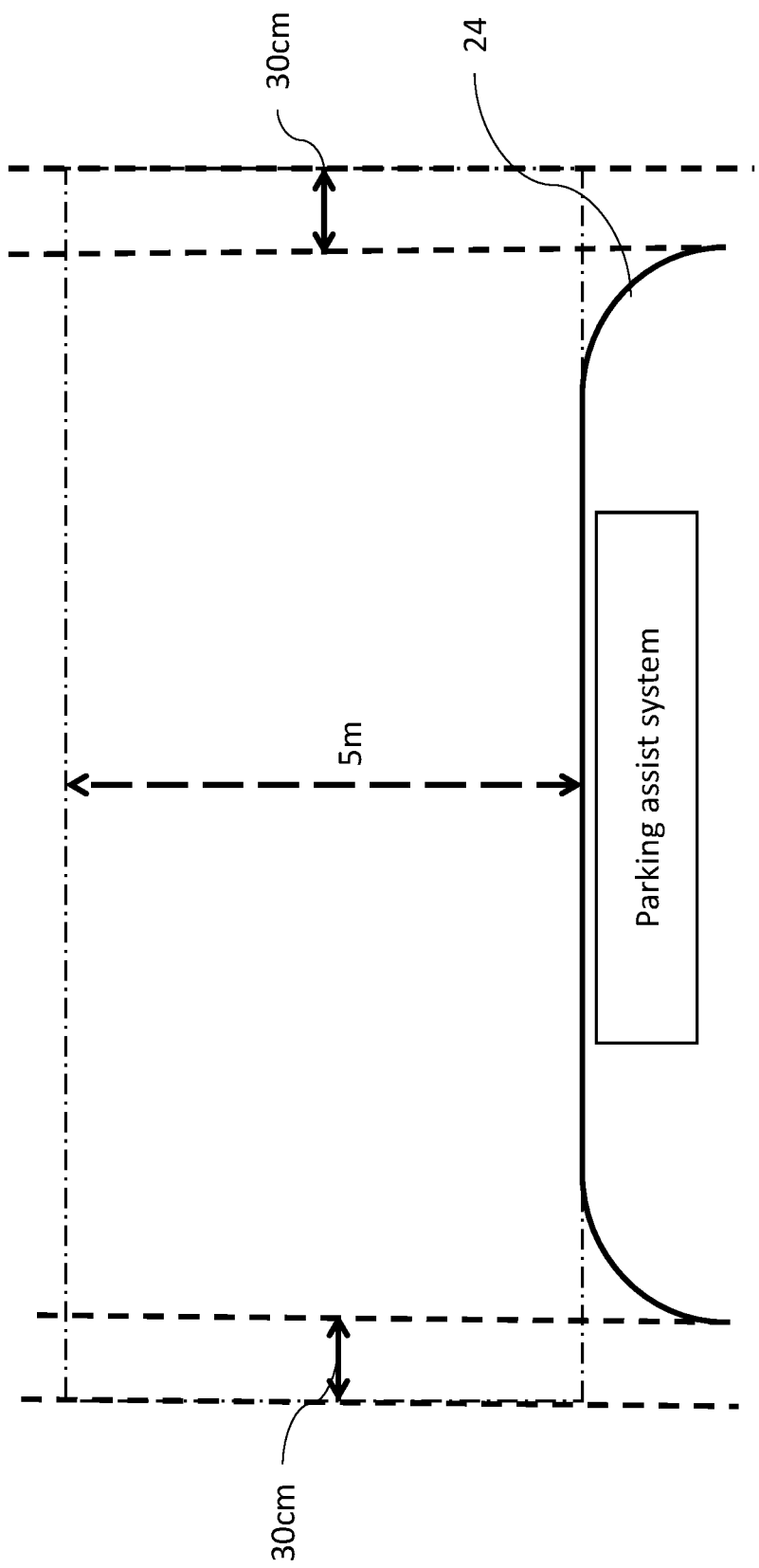
FIG. 8 is a schematic view of a radar system of the present invention applied to a parking assist system (PAS).

FIG. 8 is a schematic view of a radar system of the present invention applied to the parking assist system (PAS). In the embodiment, the radar system of the present invention is mounted on a rear bumper 24 of the vehicle, and warning conditions of the preset parking assist system (PAS) performed in the processing unit can include that a warning distance between the vehicle and the obstacle behind the vehicle is 5 m, and a warning distance between the vehicle and the obstacle aside the vehicle is 30 cm. When the vehicle is reversed and the radar system detects that the distance between the vehicle and the obstacle behind the vehicle is less than or equal to 5 m or the distance between the vehicle and the obstacle aside the vehicle is less than or equal to 30 cm, the processing unit can output the warning message.

Figure 9:
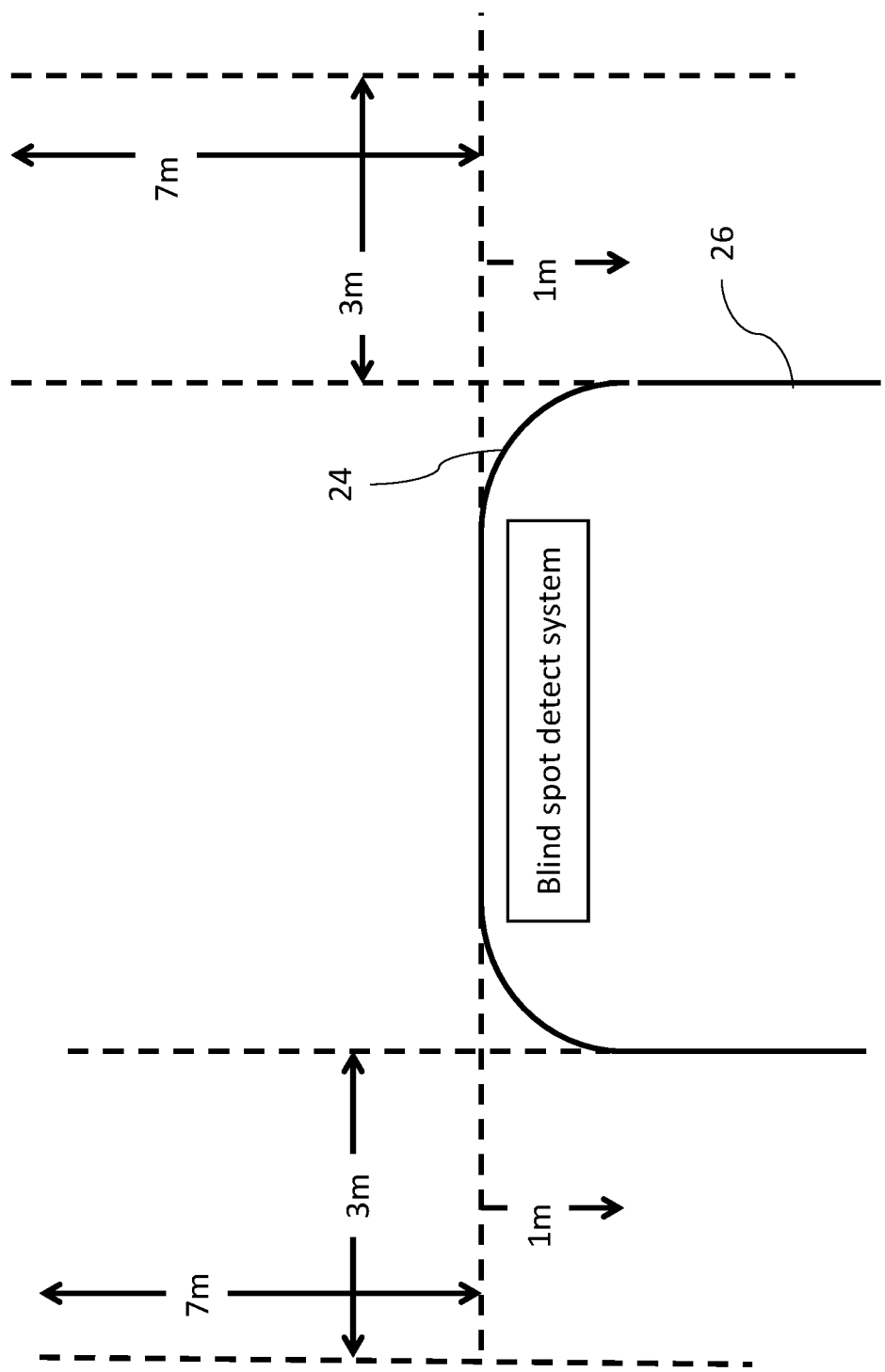
FIG. 9 is a schematic view of a radar system of the present invention applied to a blind spot detect system.

FIG. 9 is a schematic view of a radar system of the present invention applied to a blind spot detect system. In the embodiment, the radar system of the present invention is mounted on the rear bumper 24 of the vehicle, and warning conditions of the preset blind spot detection assist system performed in the processing unit can include that a warning distance between the vehicle and the obstacle behind the vehicle is 7 m, a warning distance from a tail of the vehicle toward a head of the vehicle is 1 m, and a warning distance between the side of vehicle 26 and the obstacle is 3 m. When the driver prepares to change lane, the processing unit outputs the warning message to remind the driver that the vehicle currently enters a blind spot.

Figure 10:
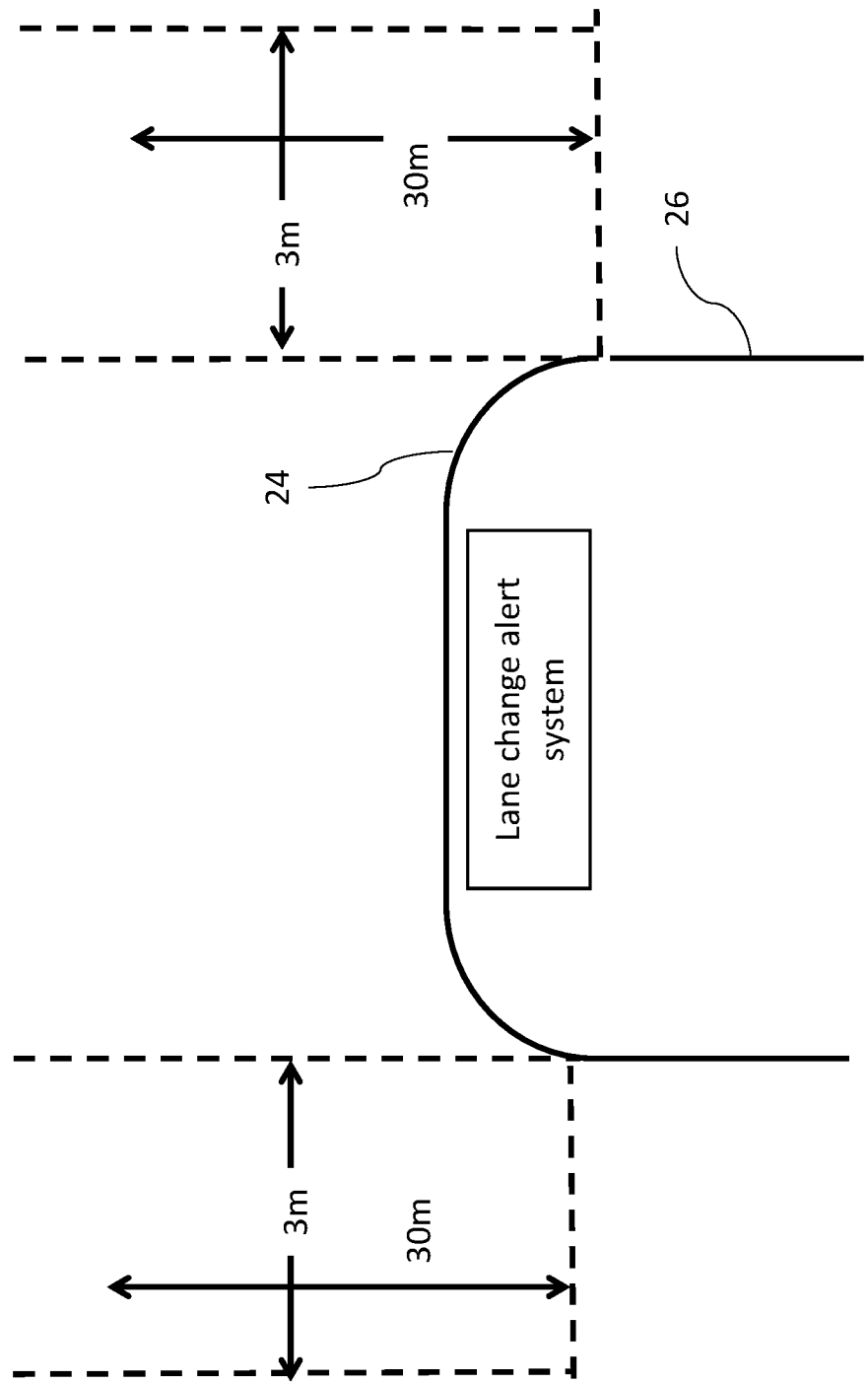
FIG. 10 is a schematic view of a radar system of the present invention applied to a lane change alert (LCA) system.

FIG. 10 is a schematic view of a radar system of the present invention applied to a lane change alert (LCA) system. Similarly to the aforementioned embodiments, the radar system of the present embodiment can be mounted on the rear bumper 24 of the vehicle, or on the front bumper of the vehicle. Because the lane change operation requires a large preparation space, the warning distance for lane change alert system is also greatly increased, and warning conditions of the preset lane change alert (LCA) system performed in the processing unit can include that a warning distance between the vehicle and the obstacle behind the vehicle is 30 m, a warning distance between the side of vehicle 26 and the obstacle is 3 m, and so on. When the driver prepares to change lane and the radar system detects that the distance between the vehicle and the surrounding obstacle is less than or equal to one of the preset warning distances, the processing unit outputs the warning message to remind the driver to suspend the lane change operation.

Figure 12:
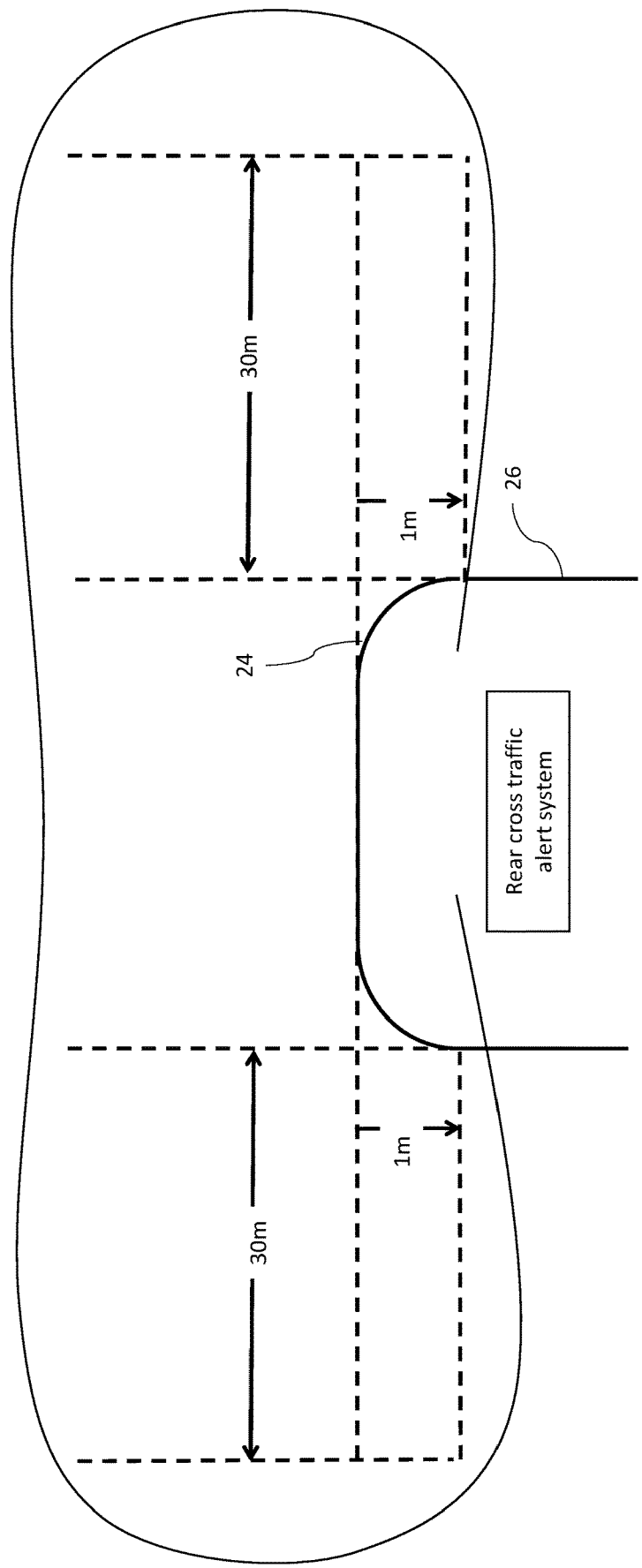
FIG. 12 is a schematic view of a radar system of the present invention applied to a rear traffic alert (RCTA) system.

FIG. 12 is a schematic view of a radar system of the present invention applied to a rear traffic alert (RCTA) system. Similarly to the aforementioned embodiments, the radar system of the present embodiment can be mounted on the rear bumper 24 of the vehicle, or on the front bumper of the vehicle. When the vehicle is reversed and the radar system detects that the distance between the vehicle and the obstacle aside the vehicle is less than or equal to 30 m or the distance between the vehicle and the obstacle aside the vehicle is less than or equal to 10 m, the processing unit can output the warning message.

Figure 11:
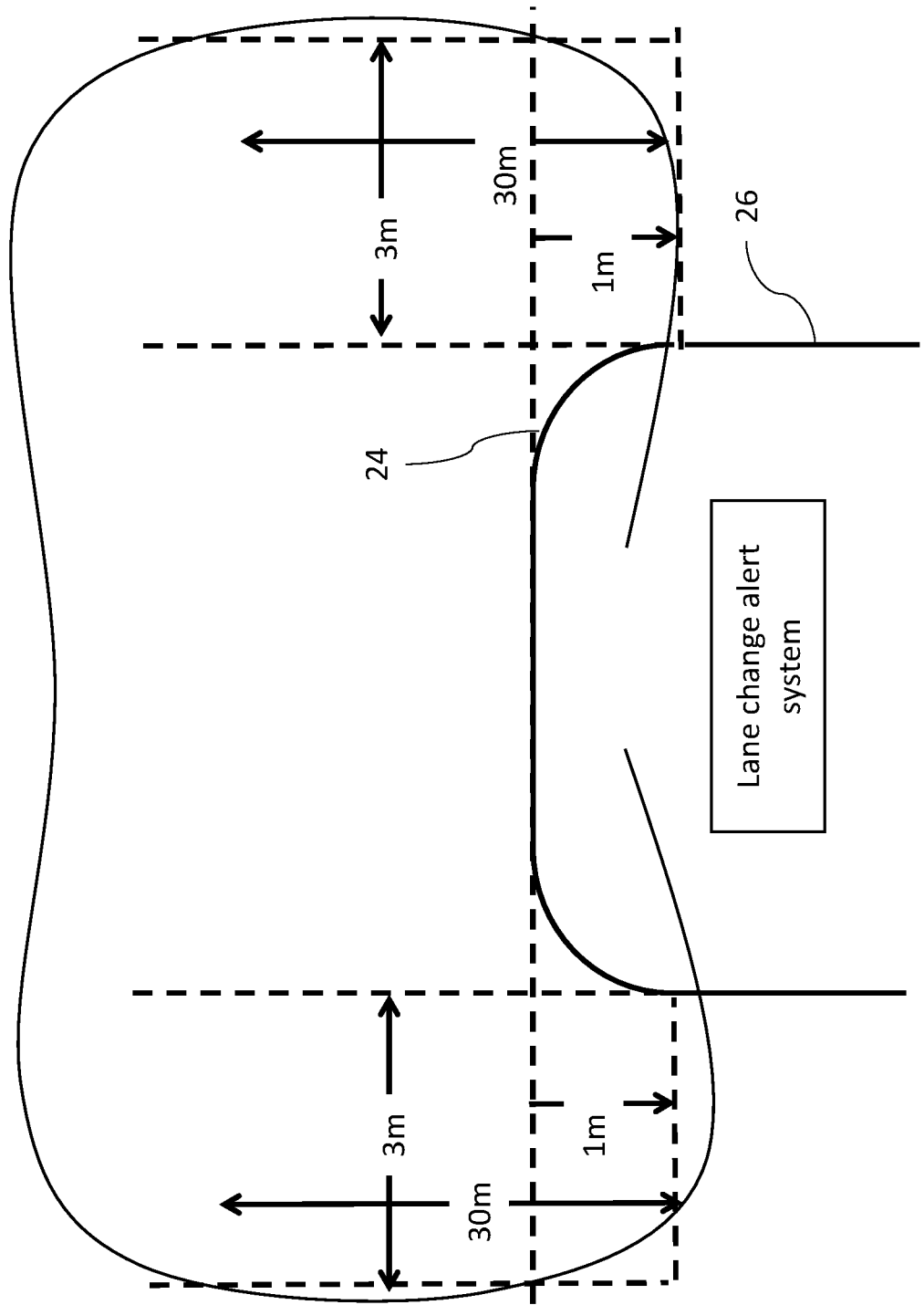
FIG. 11 is a schematic view of a range of view of a radar system having a vehicle assist function with a field of view greater than 160 degrees, according to the present invention.

As shown in FIGS. 8 to 10, the space in front of the bumper 24 is in the detection range of the radar system of the present invention, and the radar system of the present invention has a large field of view exceeding 180 degrees. For example, when the processing unit switches to perform the lane change alert (LCA) system, as shown in FIG. 11, the field of view of the radar system of the present invention even includes a range of 1.5 m behind the bumper 24, so that the present invention just requires a single radar system to achieve the functions of signal transmission and receiving, distance detection, obstacle calculation, and determination whether to warn a driver, without transmitting the detection signal back to the in-vehicle system for calculation and without mounting two radars on left and right sides of the vehicle head to process the transmitting signal and the receiving signal.

The above-mentioned vehicle assist function having fields of view greater than 160 degrees can be switched through a controller area network-bus, status of a reversing light or a speed line, BLUETOOTH™, BLE, ZIGBEE™, Wi-Fi, 2G, 3G, 4G, a base station. For example, when the reversing light of the vehicle is turned on, the processing unit automatically switches to the parking assist system (PAS) and the rear cross traffic alert (RCTA).

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A radar system having a vehicle assist function with a field of view greater than 160 degrees, the radar system comprising:
   at least one antenna board, comprising a plurality of antennas disposed thereon and configured to output at least one detection signal to detect at least one obstacle outside a vehicle, and receive at least one reflected signal, which is generated by the at least one detection signal reflected by the at least one obstacle; and
   at least one processing unit disposed on the at least one antenna board or electrically connected to the at least one antenna board, and configured to receive and analyze the at least one reflected signal, to determine a distance between the at least one obstacle and the vehicle, wherein the at least one processing unit is able to perform a plurality of vehicle assisting functions, and at least one different warning distance is defined for the plurality of vehicle assisting functions, and when the distance between the at least one obstacle and the vehicle is less than or equal to the at least one different warning distance, the at least one processing unit outputs a warning message to the vehicle, to warn a driver;
   wherein the at least one antenna board comprises a first antenna board and a second antenna board, and the first antenna board and the second antenna board are connected to form an inverted-V shape.

2. The radar system according to claim 1, wherein the at least one processing unit is a microprocessor.

3. The radar system according to claim 1, wherein the plurality of antennas comprise at least one transmitting antenna and at least one receiving antenna, and the transmitting antenna is configured to transmit the at least one detection signal, and the receiving antenna is configured to receive the at least one reflected signal, and transmit the at least one reflected signal to the at least one processing unit.

4. The radar system according to claim 1, wherein the at least one processing unit is disposed on the first antenna board or the second antenna board.

5. The radar system according to claim 1, further comprising a main board connected to the second antenna board and the first antenna board side by side in a lateral direction to form a triangle, and the at least one processing unit is disposed on the main board.

6. The radar system according to claim 5, wherein the at least one antenna board comprises at least one transmission cable disposed thereon and electrically connected to the main board via a plurality of pins or printed circuit board traces.

7. The radar system according to claim 1, further comprising a main board perpendicularly connected to an included corner between the first antenna board and the second antenna board, and the at least one processing unit is disposed on the main board.

8. The radar system according to claim 7, wherein the at least one antenna board comprises at least one transmission cable disposed thereon and electrically connected to the main board via a plurality of pins or printed circuit board traces.

9. The radar system according to claim 1, wherein one of the plurality of antennas is made by a metal wire, a printed circuit board, or a ceramic material.

10. The radar system according to claim 1, wherein one of the plurality of antennas is a patch antenna, a slot antenna, a monopole antenna, a dipole antenna, or a horn antenna.

11. The radar system according to claim 1, wherein the plurality of vehicle assisting functions comprise a function of a parking assist system (PAS), a blind spot detection (BSD) system, a lane change alert (LCA) system, a rear cross traffic alert (RCTA) system or an open door warning system (DOW).

12. The radar system according to claim 1, wherein the at least one processing unit switches the plurality of vehicle assisting functions using a controller area network-bus, Wi-Fi, 2G, 3G, 4G, or a base station or switches the plurality of vehicle assisting functions in response to a status of a reversing light or a speed line.

13. The radar system according to claim 1, wherein the warning message is transmitted to an in-vehicle system or a display device of the vehicle, and displayed on a screen of the in-vehicle system or the display device, or the warning message is configured to trigger a speaker of the vehicle to output a warning sound, or to turn on at least one warning light.

* * * * *